(12) United States Patent
Valine

(10) Patent No.: US 7,380,180 B2
(45) Date of Patent: May 27, 2008

(54) METHOD, SYSTEM, AND APPARATUS FOR TRACKING DEFECTIVE CACHE LINES

(75) Inventor: Craig M. Valine, Windsor, CO (US)

(73) Assignee: Intel Corporation, Santa Clara, CA (US)

(*) Notice: Subject to any disclaimer, the term of this patent is extended or adjusted under 35 U.S.C. 154(b) by 517 days.

(21) Appl. No.: 10/893,015

(22) Filed: Jul. 16, 2004

(65) Prior Publication Data

US 2006/0015768 A1 Jan. 19, 2006

(51) Int. Cl.
*G11C 29/00* (2006.01)

(52) U.S. Cl. ............... 714/718; 714/710; 714/711; 714/733; 365/200; 379/88.1

(58) Field of Classification Search ............ None
See application file for complete search history.

(56) References Cited

U.S. PATENT DOCUMENTS

| | | | | |
|---|---|---|---|---|
| 4,357,656 A | * | 11/1982 | Saltz et al. ............... 711/138 |
| 5,200,959 A | * | 4/1993 | Gross et al. ............... 714/723 |
| 5,493,667 A | * | 2/1996 | Huck et al. ............... 711/125 |
| 5,958,068 A | * | 9/1999 | Arimilli et al. ............... 714/8 |
| 5,966,734 A | * | 10/1999 | Mohamed et al. ........... 711/173 |
| 5,974,505 A | * | 10/1999 | Kuttanna et al. ........... 711/118 |
| 6,108,775 A | * | 8/2000 | Shiell et al. ............... 712/240 |
| 6,263,404 B1 | * | 7/2001 | Borkenhagen et al. ...... 711/137 |
| 6,467,048 B1 | * | 10/2002 | Olarig et al. ............... 714/7 |
| 6,594,785 B1 | * | 7/2003 | Gilbertson et al. ........... 714/48 |
| 6,629,201 B2 | * | 9/2003 | Dempsey et al. ........... 711/113 |
| 6,922,798 B2 | * | 7/2005 | Nemani et al. ............. 714/710 |
| 7,073,099 B1 | * | 7/2006 | Sutardja et al. ............. 714/710 |
| 7,117,312 B1 | * | 10/2006 | Cypher ....................... 711/146 |
| 2002/0199142 A1 | * | 12/2002 | Gefen ......................... 714/724 |
| 2003/0074601 A1 | * | 4/2003 | Schultz et al. ............... 714/15 |
| 2004/0080988 A1 | * | 4/2004 | Harari et al. ............... 365/200 |
| 2004/0153793 A1 | * | 8/2004 | Jarboe et al. ............... 714/27 |
| 2004/0170064 A1 | * | 9/2004 | Harari et al. .......... 365/185.29 |
| 2005/0286336 A1 | * | 12/2005 | Harari et al. ............... 365/232 |

\* cited by examiner

*Primary Examiner*—Jacques Louis-Jacques
*Assistant Examiner*—Guerrier Merant
(74) *Attorney, Agent, or Firm*—Caven & Aghevli LLC

(57) ABSTRACT

To facilitate a processor during a reset operation, a linked list of pointers to a list of defective cache lines is created. The good data bits in defective cache lines are used for creating a linked list or other data structure for storing relevant information regarding defective cache lines.

26 Claims, 3 Drawing Sheets

METHOD, SYSTEM, AND APPARATUS FOR TRACKING DEFECTIVE CACHE LINES

FIELD OF INVENTION

The present disclosure is related to cache memory, such as, for tracking defective cache lines.

BACKGROUND

As is well-known, a cache stores information for a computer or computing system in order to decrease data retrieval times for a processor. Some examples of computing systems are a personal digital assistant, internet tablet, and a cellular phone. The cache stores specific subsets of information in high-speed memory. A few examples of information are instructions, addresses, and data. When a processor requests a piece of information, the system checks the cache first to see if the information is stored within the cache. If so, the processor can retrieve the information much faster than if the data was stored in other computer readable media, such as, random access memory, a hard drive, compact disc read-only memory (CD ROM), or a floppy disk.

Modern integrated circuit (IC) devices include large numbers of gates on a single semiconductor chip, with these gates interconnected so as to perform multiple and complex functions. The fabrication of an IC incorporating such Very Large Scale Integration (VLSI) must be error free, as any manufacturing defect may prevent the IC from performing all of the functions that an IC or SoC is designed to perform. Such demands require verification of the design of the IC or SoC and also various types of electrical testing after the IC or SoC is manufactured.

As cache sizes increase, so does the impact to yield. Consequently, testing and manufacturing become more complex. Typically, one reduces the impact to yield by allowing a processor to have a predetermined number of defective lines. However, one would need to disable the defective lines during a manufacturing or normal execution. Regardless of the method of disabling the defective lines, one needs to track the defective lines. For example, one needs to track the defective lines across processor reset since the reset may have destroying the tags associated with the defective lines. One solution is placing a fixed number of defective cache lines in dedicated on-core resources. Consequently, this increases hardware requirements. Furthermore, this limits the number of disabled lines by the amount of dedicated resources and may only allow for a fixed number of disabled lines.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

An area of current technological development relates to improving the yield efficiency of cache memory. As previously described, one needs to track the disable lines across processor reset since the reset may have destroying the tags associated with the defective lines. One solution is placing the disabled cache lines in dedicated on-core resources, such as, on a processor. Consequently, this increases hardware requirements. Furthermore, this limits the number of disabled lines by the amount of dedicated resources. In contrast, the claimed subject matter teaches utilizing data bits in defective cache lines, such as, cache lines that have data bit errors, for creating a linked list or other data structure for storing relevant information regarding defective cache lines.

Figure 1:
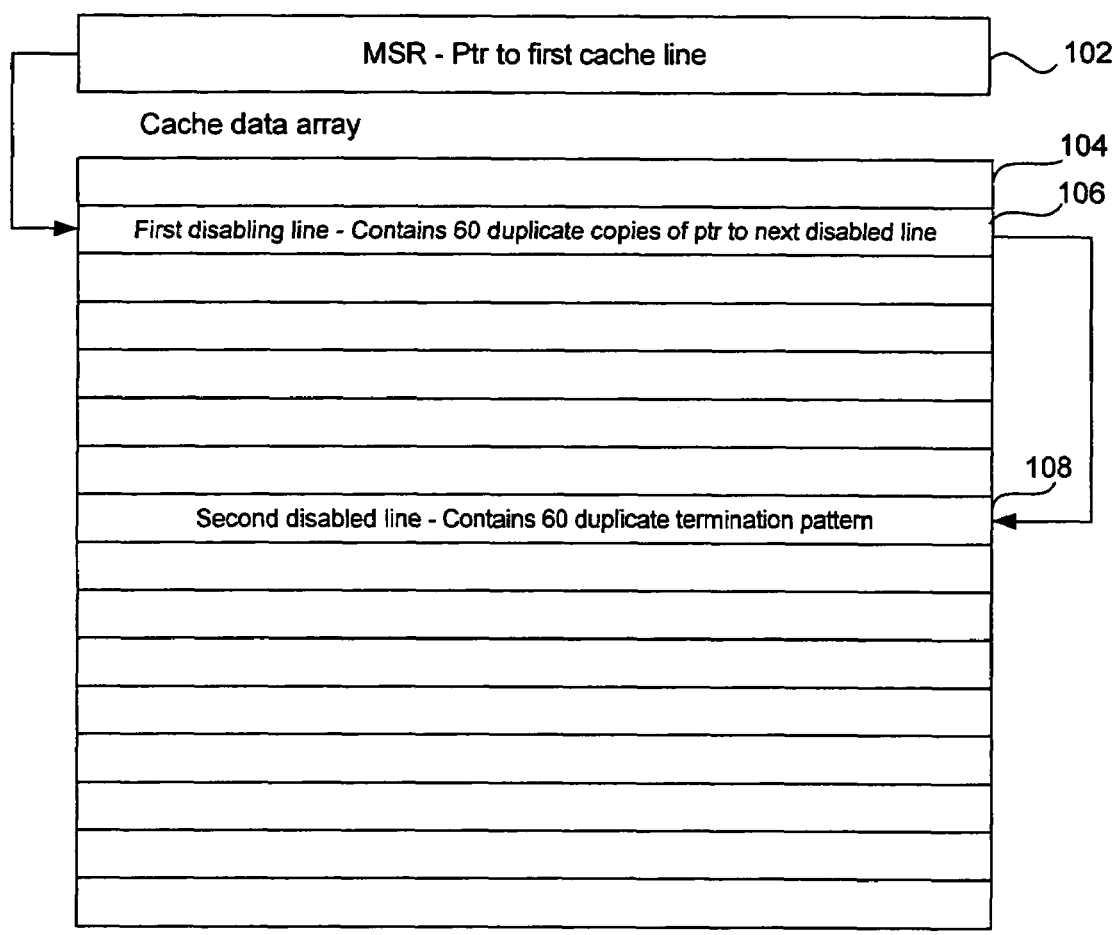
FIG. 1 is an apparatus to track disabled cache lines as utilized by an embodiment.

FIG. 1 is an apparatus to track disabled cache lines as utilized by an embodiment. In this embodiment, an on-core resource, such as, a machine specific register (MSR) 102 contains a pointer to point to a first disabled/defective cache line in a cache data array 104. A MSR is a register that is not intended for general or application use. Alternatively, an on chip random access memory (RAM Within the first disabled/defective cache line 106, several good data bits contain a pointer to the next disabled line 108. Despite the fact the first cache line 106 is defective or disabled, in one embodiment, one could store repetitive copies of the pointer to the second disabled/defective cache line. Alternatively, in another embodiment, one could utilize only one copy of the pointer while utilizing error correcting code (ECC) to insure pointer reliability. With either of the previous embodiments, a linked list of pointers for the respective disabled/defective cache lines is formed. Consequently, this linked list is preserved during a warm reset (power remains intact) of the processor and allows for an arbitrary number of disabled cache lines. Therefore, the processor quickly recreates the disabled lines by using this linked list and allows for an arbitrary number of disabled cache lines by placing a pointer in each disabled cache line. In contrast, the prior art destroys the tags for the defective lines during the reset.

In one embodiment, an additional MESI (Modified Exclusive Shared Invalid) state could be utilized to disable cache lines in the data array. For example, in one embodiment, a P state is defined for a disabled cache line.

For example, seventeen bits for a 12 Mb cache (four for determining the way and thirteen for the index) is utilized to determine the next disabled cache line for a cache with a 1K bit line. Thus, sixty copies of the pointer (17 bits) to the next line can be used. In one embodiment, one could use an algorithm to analyze every pointer copy to determine which pointer pattern is represented the most times. Alternatively, one could also utilize only one pointer and use ECC. For the preceding example of 60 pointer copies in one disabled/defective cache line, twenty nine pointer copies could be destroyed due to defects. However, the data for the pointer could still be restored since thirty one copies are valid. Furthermore, the last disabled cache line could contain a repeated termination pattern for the pointer. Alternatively, one could utilize an invalid way encoding for the pointer in the last disabled cache line to indicate that this is the last disabled cache line.

Figure 2:
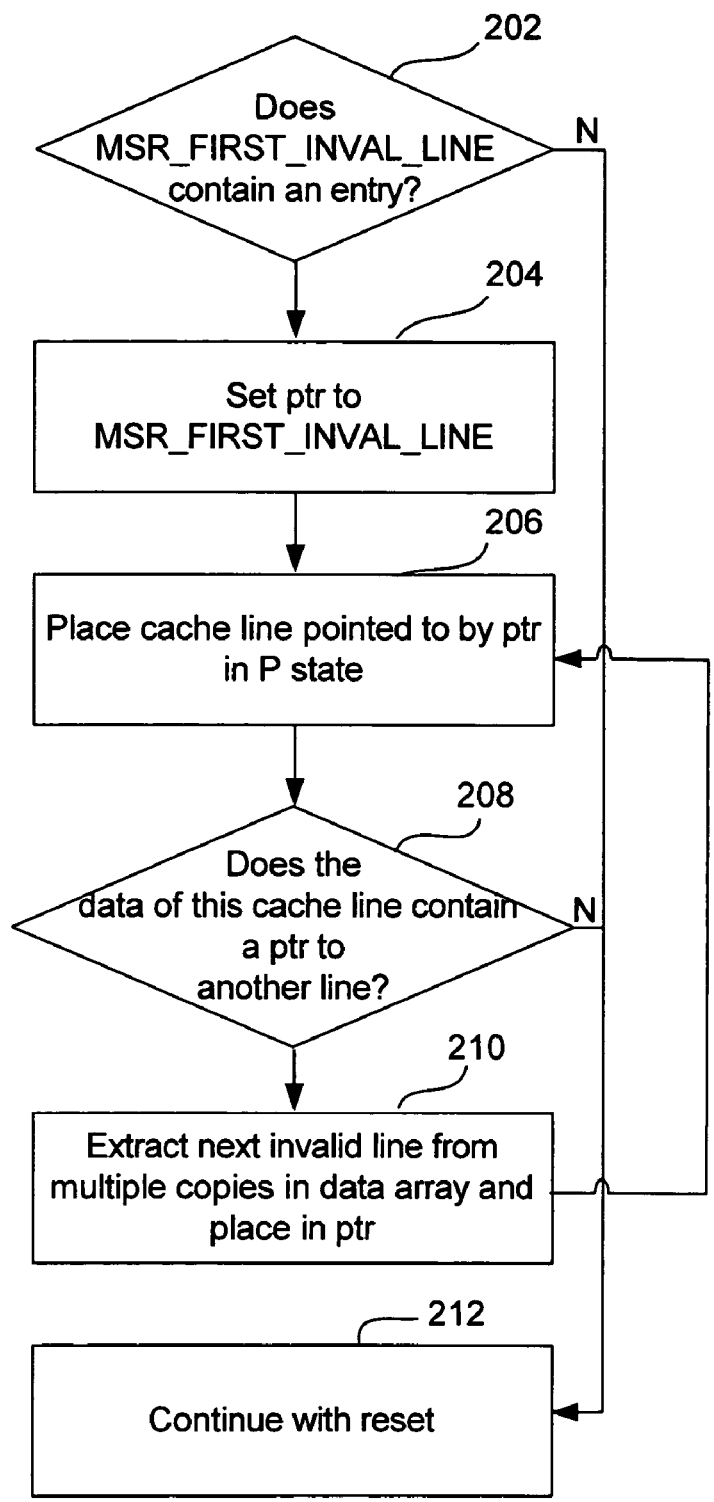
FIG. 2 is a flowchart for a method for disabling cache lines as utilized by an embodiment.

FIG. 2 is a flowchart for a method for disabling cache lines as utilized by an embodiment. In this flowchart, a processor is performing a reset operation and a processor is determining whether to disable a cache line based on previously stored pointers. For example, a first pointer to a first cache disabled line is stored in a dedicated on-core resource, such as, a machine specific register (MSR). In this embodiment, the MSR is designated as "MSR_FIRST_INVAL_LINE". At decision block 202, a decision is reached on whether there is an entry in this register. If so, a pointer to the first disabled cache line is set to the entry stored in MSR_FIRST_INVAL_LINE (at block 204). Otherwise, the flowchart proceeds to block 212 to continue with the reset operation.

The analysis continues with block 206 since the pointer is pointing to a cache line as indicated by the pointer in the previously described MSR. Since the pointer indicates that this line should be disabled, this particular cache line is placed in a disabled state, "P state". Subsequently, a repetitive analysis is performed to determine whether the present cache line has a pointer to another cache line. If so, the single or multiple copies of data for the pointer is extracted to set the next pointer to the next cache line which will be disabled, as previously described in block 206. Otherwise, the processor continues with the reset operation.

Figure 3:
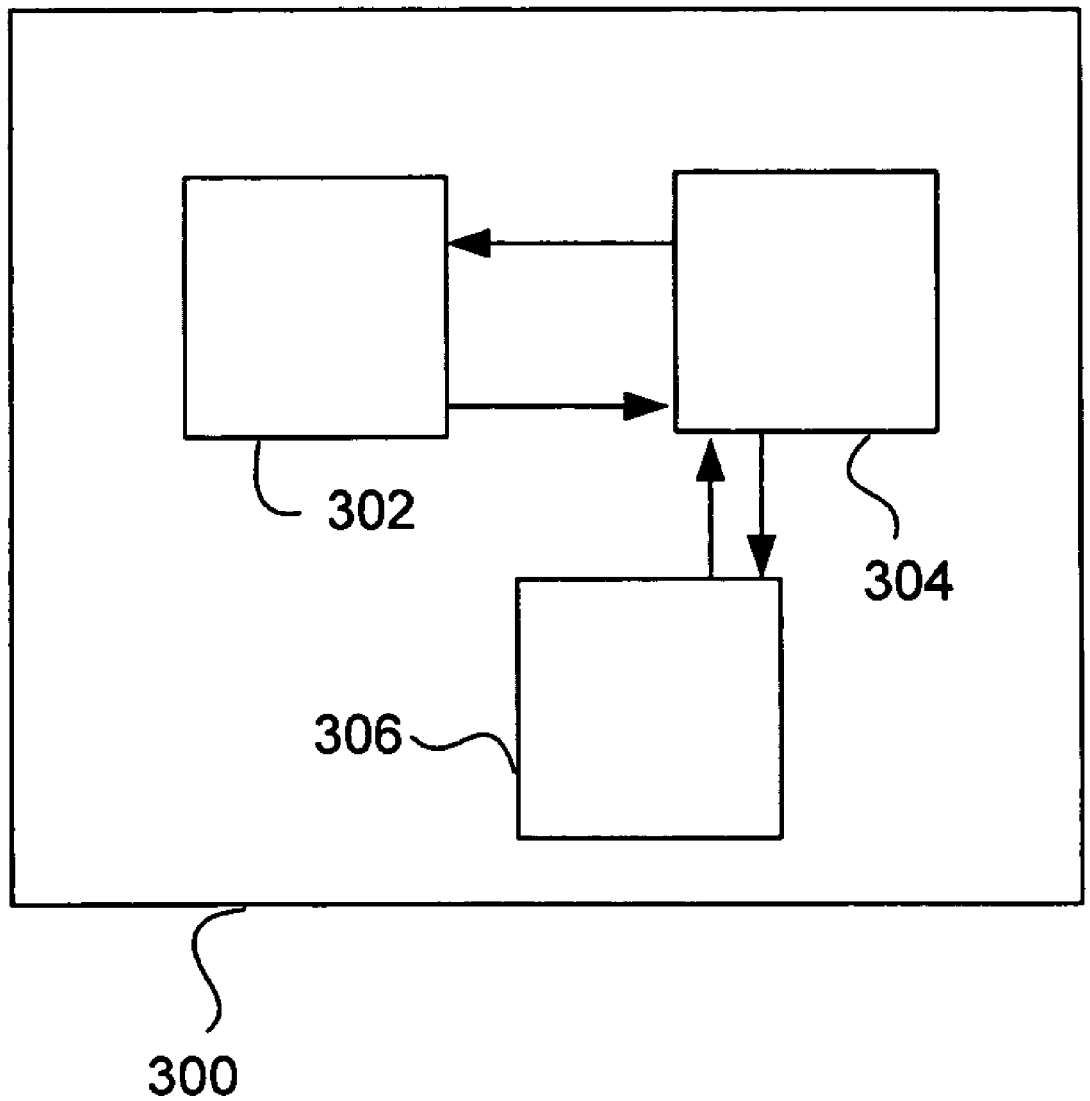
FIG. 3 is a system as utilized by an embodiment.

FIG. 3 illustrates a system in accordance with one embodiment. The system in one embodiment is a processor 302 that is coupled to a chipset 304 that is coupled to a memory 306. For example, the chipset performs and facilitates various operations, such as, memory transactions between the processor and memory. In one embodiment, the system comprises one or all of the previous embodiments for tracking disabled cache lines and disabling cache lines depicted in connection with FIGS. 1-2. For example, the system may be coupled to a variety of requesting devices and arbitrated resources (as previously described) and incorporates the arbitration schematic and methods described earlier to arbitrate access between the requesting agents and the arbitrated resource.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. An apparatus to store a plurality of pointers to a plurality of defective cache lines comprising:
   an on-core resource to store a first pointer of the plurality of pointers to a first defective cache line of the plurality of defective cache lines; and
   the plurality of defective cache lines, wherein each of the plurality of defective cache lines is to store a pointer to a next defective cache line of the plurality of defective cache lines.

2. The apparatus of claim 1 wherein the on-core resource on a processor is a machine specific register (MSR).

3. The apparatus of claim 1 wherein the plurality of defective cache lines are for a level three cache.

4. The apparatus of claim 1 wherein each of the defective cache lines has multiple copies of the pointer to a next disabled cache line of the plurality of disabled cache lines.

5. The apparatus of claim 1 wherein each of the defective cache lines has a single copy of the pointer and error correcting code, the pointer is for the next defective cache line of the plurality of defective cache lines.

6. The apparatus of claim 1 wherein a linked list of pointers to the plurality of defective cache lines is created to facilitate a processor during a reset operation.

7. The apparatus of claim 1 wherein a last defective cache line of the plurality of defective cache lines has a repeated termination pattern for the pointer to indicate that this is the last defective cache line.

8. The apparatus of claim 1 wherein a last defective cache line of the plurality of defective cache lines has an invalid way encoding for the pointer in the last defective cache line to indicate that this is the last defective cache line.

9. A method for disabling cache lines comprising:
   searching an on-core resource for a first pointer to a first cache line;
   disabling the first cache line if the first pointer exists in the on-core resource;
   searching the first cache line for multiple copies of a second pointer to a second cache line;
   determining whether the multiple copies of the second pointer are valid, if so, disabling the second cache line as indicated by the second pointer.

10. The method of claim 9 wherein disabling cache lines are performed during a warm reset of a processor.

11. The method of claim 9 wherein disabling cache lines places the cache lines in a disabled P state.

12. A method for disabling cache lines comprising:
   searching an on-core resource for a first pointer to a first cache line;
   disabling the first cache line if the first pointer exists in the on-core resource;
   searching the first cache line for a second pointer to a second cache line;
   disabling the second cache line if the second pointer exists in the first cache line; and
   terminating the search if either an invalid way encoding or a repeated termination is detected.

13. The method of claim 12 wherein disabling cache lines are performed during a warm reset of a processor.

14. The method of claim 12 wherein disabling cache lines places the cache lines in a disabled P state.

15. An apparatus to store a plurality of pointers to a plurality of defective cache lines comprising:
   an on-core resource to store a first pointer of the plurality of pointers to a first defective cache line of the plurality of defective cache lines; and
   a plurality of defective cache lines with a plurality of good bits, the plurality of good bits in each of the plurality of defective cache lines to store a pointer to a next defective cache line of the plurality of defective cache lines.

16. The apparatus of claim 15 wherein the on-core resource on a processor is a machine specific register (MSR).

17. The apparatus of claim 15 wherein the plurality of defective cache lines are for a level three cache.

18. The apparatus of claim 15 wherein each of the defective cache lines has multiple copies of the pointer to a next defective cache line of the plurality of defective cache lines.

19. The apparatus of claim 15 wherein each of the defective cache lines has a single copy of the pointer and error correcting code, the pointer is for the next defective cache line of the plurality of defective cache lines.

20. The apparatus of claim 15 wherein a linked list of pointers to the plurality of defective cache lines is created to facilitate a processor during a reset operation.

21. The apparatus of claim 15 wherein a last defective cache line of the plurality of defective cache lines has a repeated termination pattern for the pointer to indicate that this is the last defective cache line.

22. The apparatus of claim 15 wherein a last defective cache line of the plurality of defective cache lines has an invalid way encoding for the pointer in the last defective cache line to indicate that this is the last defective cache line.

23. The apparatus of claim 15 wherein the on-core resource on a processor is an on chip RAM.

24. A system comprising:

at least one processor;

a cache, with a plurality of defective cache lines;

an on-core resource to store a first pointer of the plurality of pointers to a first defective cache line of the plurality of defective cache lines, the plurality of defective cache lines, wherein each of the plurality of defective cache lines is to store a pointer to a next defective cache line of the plurality of defective cache lines; and the processor to utilize a linked list of the plurality of pointers to recreate and disable the plurality of defective cache lines during a reset operation.

25. The system of claim 24 wherein the reset operation is a warm reset.

26. The system of claim 24 wherein the cache with the plurality of defective cache lines is a level three cache.

* * * * *